(12) United States Patent
Kusters

(10) Patent No.: US 6,353,387 B1
(45) Date of Patent: Mar. 5, 2002

(54) METHOD AND A DEVICE FOR COLLECTING OR STORING OBJECTS IN A WAREHOUSE

(76) Inventor: Jan Theodorus Kusters, Wedesteinbrook 1085, NL-6546 RB Nijmegen (NL)

( * ) Notice: Subject to any disclaimer, the term of this patent is extended or adjusted under 35 U.S.C. 154(b) by 0 days.

(21) Appl. No.: 09/600,800

(22) PCT Filed: Dec. 31, 1998

(86) PCT No.: PCT/NL98/00745

§ 371 Date: Jul. 21, 2000

§ 102(e) Date: Jul. 21, 2000

(87) PCT Pub. No.: WO99/37562

PCT Pub. Date: Jul. 29, 1999

(30) Foreign Application Priority Data

Jan. 23, 1998 (NL) .............................................. 1008100

(51) Int. Cl.[7] .............................................. G08B 13/14
(52) U.S. Cl. .................................. 340/568.1; 340/5.92
(58) Field of Search .......................... 340/568.1, 5.92; 235/383, 385; 705/28, 22; 174/52.1

(56) References Cited

U.S. PATENT DOCUMENTS

| | | | | |
|---|---|---|---|---|
| 4,766,295 A | * | 8/1988 | Davis et al. ................ 235/383 |
| 5,111,196 A | * | 5/1992 | Hunt .......................... 340/5.91 |
| 5,250,789 A | * | 10/1993 | Johnsen ...................... 235/383 |
| 5,448,226 A | * | 9/1995 | Failing et al. ............. 340/5.91 |
| 5,632,010 A | * | 5/1997 | Briechle et al. ................ 345/1 |
| 5,671,362 A | * | 9/1997 | Cowe et al. ......... 340/568.1 X |
| 5,975,416 A | * | 11/1999 | Chow et al. ................ 235/383 |

FOREIGN PATENT DOCUMENTS

| | | | |
|---|---|---|---|
| DE | 3622817 | * | 1/1987 |
| DE | 07577 | | 9/1994 |
| EP | 0169118 | * | 1/1986 |
| EP | 0564065 | * | 10/1993 |
| WO | 11156 | | 4/1996 |

OTHER PUBLICATIONS

Translation (PTO 01–2078) of German publication 9407577.8, Sep. 1994.*

* cited by examiner

*Primary Examiner*—Thomas Mullen
(74) *Attorney, Agent, or Firm*—Webb Ziesenheim Logsdon Orkin & Hanson, P.C.

(57) ABSTRACT

An apparatus is moved along a rail to a location where objects are to be collected or stored. The apparatus provides information regarding the objects. The rail is provided with electrical conductors, and the apparatus is provided with contacts which are in contact with the conductors. Electric current for a drive unit which drives the apparatus is supplied to the apparatus via the conductors. The apparatus receives data for providing the information via the same conductors and contacts.

15 Claims, 4 Drawing Sheets

METHOD AND A DEVICE FOR COLLECTING OR STORING OBJECTS IN A WAREHOUSE

BACKGROUND OF THE INVENTION

1.) Field of the Invention

The present invention relates to a method for collecting or storing objects in a warehouse, wherein an apparatus which is capable of movement along a rail is moved to a location where objects are to be collected or stored, which apparatus provides information with regard to the objects in question, wherein said rail is provided with electrical conductor means and wherein said apparatus is provided with contact elements, which are in contact with said conductor means, via which conductor means electric current is supplied to said apparatus for the drive unit which drives the apparatus.

2.) Description of the Prior Art

The collecting of objects from a warehouse can take place completely automatically, for example by means of robots, but it can also be carried out by warehouse employees, wherein each warehouse employee uses aids which enable him to perform his duties in an efficient manner. It is important that each employee receives clear-cut information in an efficient manner, that he can find the relevant space in the storage rack without difficulty, that he has his hands free as much as possible for picking up the objects in question, and furthermore it is important that the employee only needs to carry out a limited number of operations.

The apparatus, also called warehouse robot or rackrunner®, rides on a rail with a number of wheels and stops at predetermined locations in order to supply the necessary information or carry out checks at said locations.

It is important that the apparatus is fed with the necessary data in a reliable manner during use. In PCT/NL95/00346 it is proposed to have the apparatus communicate with a central computer by transmitting data radiographically. In practice, however, this may lead to malfunction, since signals causing interference are produced in the surrounding area, or since the signals which provide the communication with the apparatus cause interference for other devices. It is partially for that reason that all kinds of regulations apply to the use of radiographic data transmission, which regulations vary per country. Accordingly, it is not possible to provide a system for universal usage.

It is, therefore, an objective of the present invention to provide a method wherein communication with the apparatus can take place in an effective and reliable manner, without any risk of interference of or by other systems and without special facilities on the apparatus being required.

SUMMARY OF THE INVENTION

In order to accomplish that objective, the apparatus is fed with data for providing the information via said conductor means and via said contact elements, which also supply the power for the drive unit of the apparatus. This implies that the same means are used for said power supply and for said communication, which leads to a simplification and to other advantages as referred to above. A modem in the apparatus and a modem in the central computer with which the apparatus communicates thereby carry out the conversion of data to be transmitted into signals which can be transferred via an electrical conductor. This equipment is simpler, cheaper and more reliable than transmitting equipment.

In one preferred embodiment, the apparatus not only receives data from a central computer via the conductor means and the contact elements, but it also transmits data to a central computer, that is, a processing and/or storage unit for said data, via said contact elements and said conductor means.

Preferably, the data are fed to the apparatus and transmitted by said apparatus during short interruptions of the power supply to the apparatus. This may for example take place in that means are present for interconnecting the two modems as soon as the power supply is temporarily interrupted. Said interruption will preferably take place when the apparatus is stationary for communication with operating staff.

In another preferred embodiment, the power supply to the apparatus is temporarily interrupted, for example for a fraction of a second, the moment data need to be transmitted. The transmitting modem can interrupt the current supply thereby, after which the receiving modem recognizes said interruption as a signal that data are about to be transmitted. Said interruption is so short that it does not interfere with the operation of the apparatus. Preferably, the apparatus comprises a rechargeable battery, which ensures a constant power supply to the apparatus, also during interruptions in the power supply.

In another preferred embodiment, the data are fed to the apparatus and transmitted by the apparatus while power is being supplied to the drive unit, to which end the voltage of the current is modulated. The voltage is imparted a small fluctuation thereby, which is produced by a modem and which can subsequently be converted again into transmitted information by another modem.

The invention furthermore relates to a device for collecting or storing objects in a warehouse, which device comprises an apparatus which is capable of indicating how many objects are to be collected or stored at a particular location and/or which converts data into visible or audible information, and which comprises a rail along which said apparatus can be moved, which rail is provided with electrical conductor means, and which apparatus is provided with contact elements, which are in contact with said conductor means, via which conductor means and contact elements electric power can be supplied to the apparatus for the drive unit which drives the apparatus, which device comprises means for supplying said apparatus with data, via said conductor means and said contact elements, for providing said information.

Preferably, said contact elements are sliding contacts, which are capable of sliding over the conductor means present in the rail, and in another preferred embodiment said contact elements comprise wheels which are capable of rolling on the conductor means present in the rail. Both possibilities are well-tested means for transferring electrical signals. Preferably, the same sliding contacts or wheels are used for supplying power to the drive unit of the apparatus.

The apparatus is preferably provided with a keypad and/or a display and/or a printer and/or a loudspeaker and/or an indicator which is capable of referring to a space in the warehouse and/or a pilot light and/or a carrying handle and/or a scanner which is capable of reading a bar code on the rail and/or a signal port for a manually operated scanner and/or a fixed bar code scanner for recognizing objects.

In one preferred embodiment, the apparatus comprises a weighing device for weighing goods at the location where they are stored. Such a mobile weighing device may also be considered to constitute a separate invention.

Preferably, a conveyor is furthermore provided, which can be moved to the location where the apparatus is present, whereby a wireless exchange of data takes place between the apparatus and the conveyor by means of infrared or ultrasonic signals. Such wireless transmission of data is known per se. In another embodiment, a warehouse employee can communicate with the apparatus by means of a keypad and/or a display, which is disposed remote from the apparatus, for example on the conveyor, wherein the data are transmitted by means of infrared or ultrasonic signals.

BRIEF DESCRIPTION OF THE DRAWINGS

The figures are merely schematic representations of the embodiment, wherein corresponding parts are indicated by the same numerals.

DESCRIPTION OF THE PREFERRED EMBODIMENTS

Figure 1A:
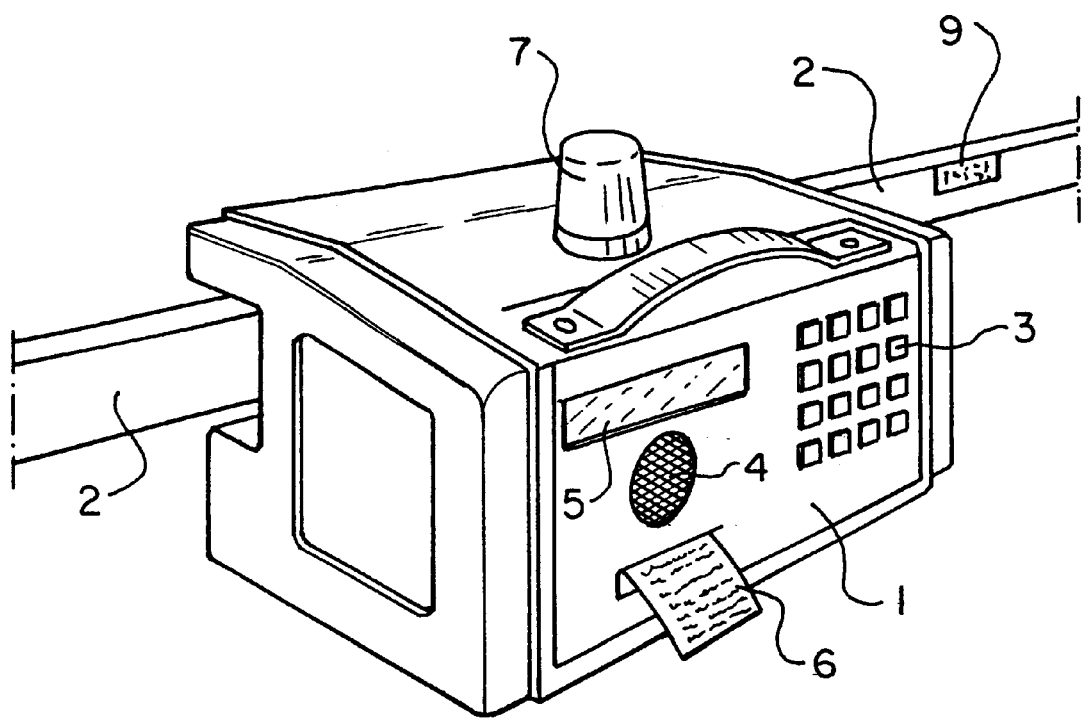
FIG. 1a is a perspective view of the apparatus.
Figure 1B:
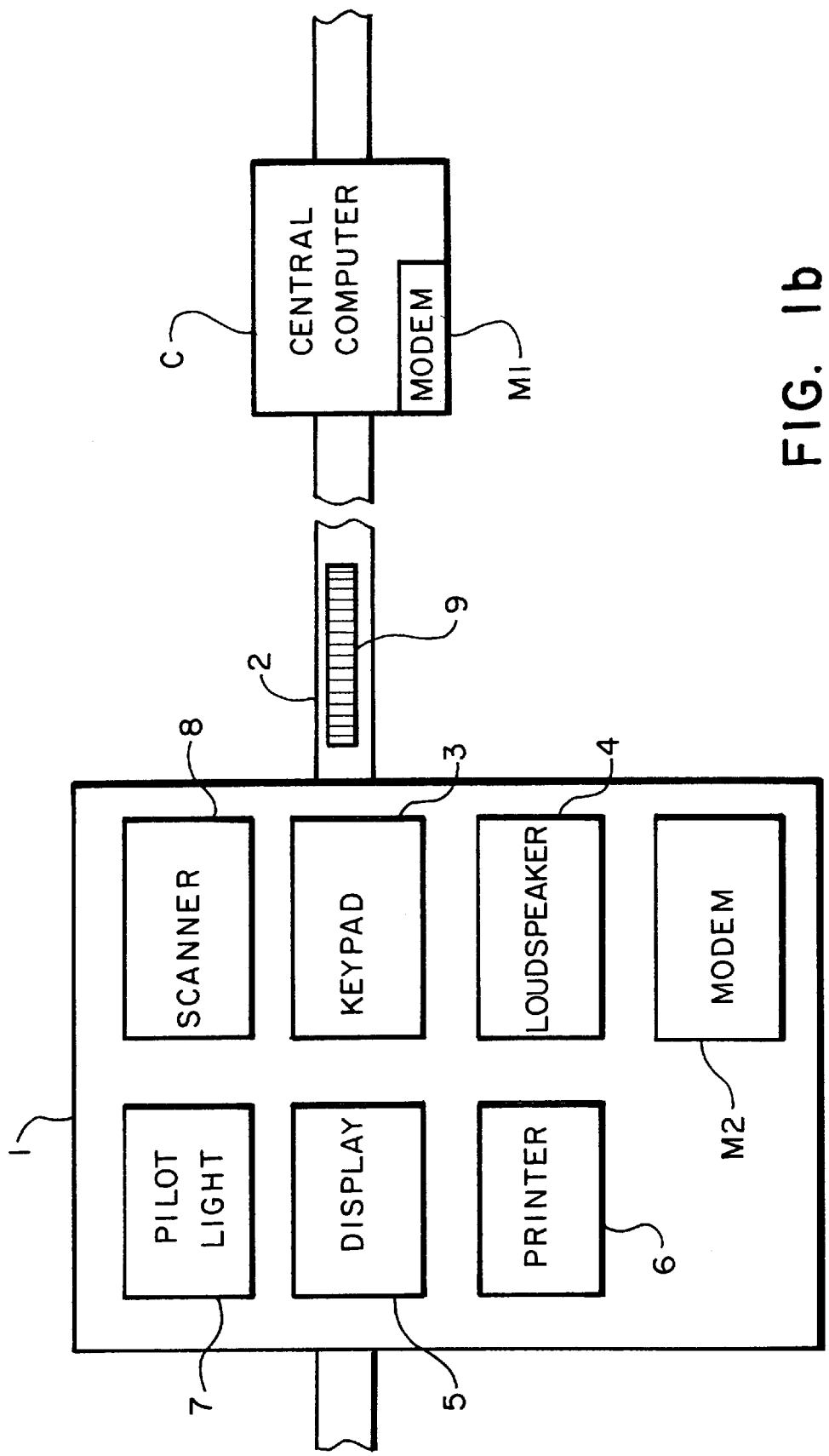
FIG. 1b is a block diagram of the apparatus.

FIGS. 1a and 1b show an apparatus 1 which is capable of movement along a rail 2. The apparatus comprises a number of components, such as a keypad 3, a loudspeaker 4, a display 5, a printer 6 and a pilot light 7. The apparatus 1 is furthermore provided with a scanner 8 which is capable of reading the bar code of a strip 9 during movement of apparatus 1, which strip is affixed to rail 2. When moving along warehouse racks, the apparatus determines its location via said strips 9. When apparatus 1 arrives at a predetermined position and establishes this fact in that the scanner reads the respective bar code, apparatus 1 will come to a standstill and pilot light 7, for example, will light up and/or an acoustic signal will be delivered by means of loudspeaker 4. It can be indicated on display 5 how many products and which products are to be removed from the warehouse, and printer 6 may be used for producing labels, for example, which are to be affixed to the products. Operating staff can communicate with apparatus 1 by means of keypad 3.

Apparatus 1 facilitates the collection of products from a warehouse or the storage of products in a warehouse. It provides the warehouse employee with the necessary information, and that at the location where said employee needs the information, whilst the person in question will have his hands free for the warehouse work he or she must perform. A weighing device (not shown in the figure) which is present on the apparatus may be used for weighing the product or products, wherein the weight thus determined is registered.

Figure 2:
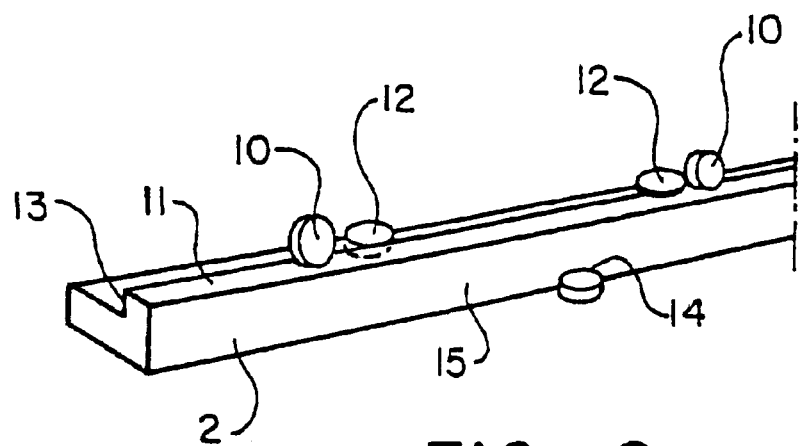
FIG. 2 is a perspective view of a rail portion.

FIG. 2 shows a portion of rail 2, wherein the position of the five wheels via which the apparatus 1 moves along the rail is schematically indicated. Two wheels 10 ride on a horizontal running surface 11 on the upper side of rail 2. Two wheels 12 ride on a vertical running surface 13 on the rear side of rail 2, which running surface 13 is located near running surface 11. A fifth wheel 14 rides on a vertical running surface 15 on the front side of rail 2, near the underside thereof.

All wheels 10, 12, 14 are rotatably journalled in apparatus 1, and one or more of said wheels can be driven by means of a driving motor which is present in apparatus 1, so that the apparatus is capable of movement along the rail.

Figure 3:
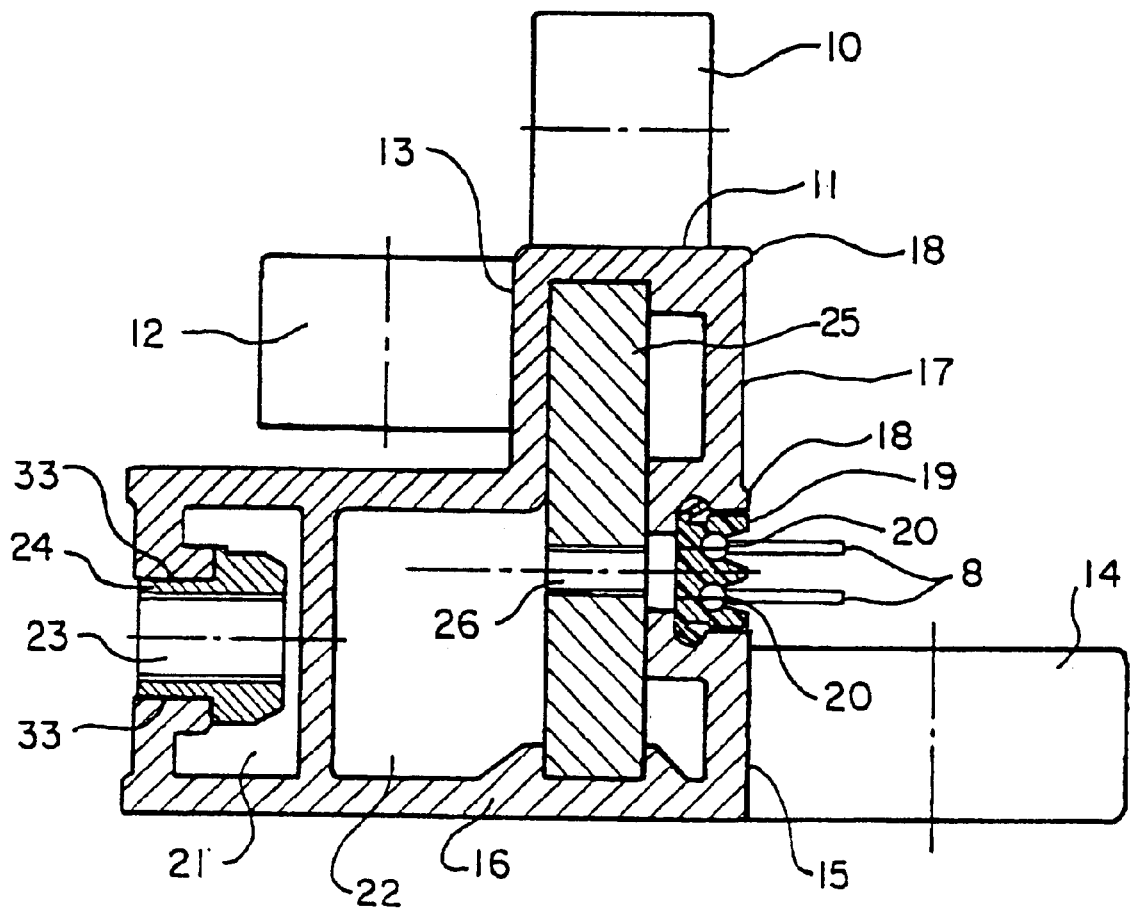
FIG. 3 is a cross-sectional view of a rail.

Rail 2 essentially consists of a section, which is shown in more detail in FIG. 3. Wheels 10, 12, 14 are schematically illustrated. The hollow section 16 which is shown in cross-sectional view in FIG. 3 is made of aluminum.

Section 16 is provided with a first horizontal running surface 11 on its upper side, a second vertical running surface 13 on its rear side, and a third vertical running surface 15 on its front side. Section 16 furthermore comprises a surface 17 on its front side, to which a strip 9 [(FIG. 1)] provided with a bar code can be affixed. A ridge 18 is present on either side of surface 17, so that strip 9 is protected against being damaged.

Section 16 is provided with a recess between running surface 15 and surface 17, in which recess a strip 19 of plastic material is present, which strip contains two conductor wires 20, which form electrical conductor means. Sliding contacts 8 (schematically indicated), which are mounted on apparatus 1 and which transport electric power to apparatus 1, slide along said wires 20, which power is used for driving apparatus 1. It is possible thereby to use 12 V or 24 V DC, for example.

A first space 21 and a second space 22 are present in the interior of section 16. Space 21 comprises a slot 23 on the rear side of said section, which extends along the length of the section. The cross-sectional view of FIG. 3 shows a nut 24 present in said slot 23, by means of which section 16 can be fixed in position. Nut 24 may have two parallel surfaces 33, via which the nut can slide into slot 23 and which lock the nut against rotation.

As is shown in FIG. 3, a connecting element 25 is present in space 22 of section 16, which element can be slid into space 22 with a tight fit, as is apparent from FIG. 3. Connecting element 25 is made of steel, for example, and it can be fixed in position in section 16 by means of screw 26, which can be screwed into connecting element 25, and whose head is present in a circular hole in section 16, which hole is closed by fitting the plastic strip 19 thereover after screw 26 has been tightened.

Not only the power supply for the drive unit of apparatus 1 takes place via conductor wires 20 and the sliding contacts 8 which are capable of movement thereover, but also the communication between a central computer C and apparatus 1. To that end, modems M1 and M2 are present in said central computer C and in apparatus 1, respectively, between which modems the necessary data are transmitted at a moment when no power is being supplied to apparatus 1. It is also possible, however, to transmit data while power is being supplied, whereby the voltage of the supply current is modulated.

Figure 4:
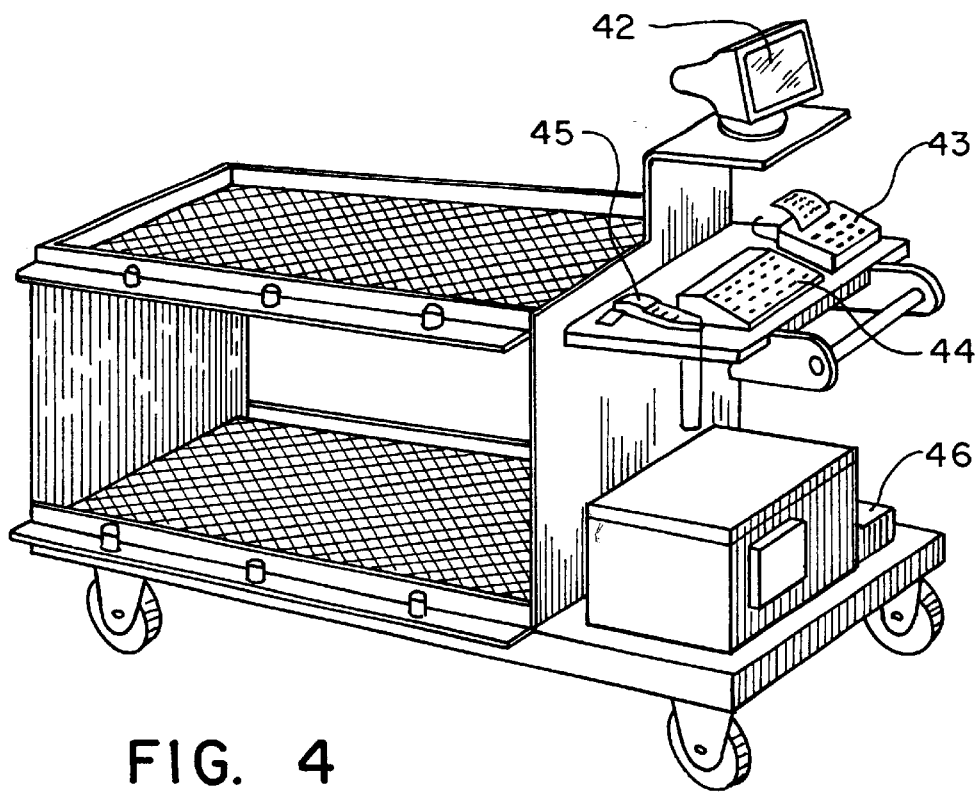
FIG. 4 shows a conveyor.

FIG. 4 shows a conveyor, which can be driven by operating staff of the warehouse to a location where the above-described apparatus is present, and where objects are to be collected from a warehouse. The conveyor comprises means for communicating 46 with the above-described apparatus 1 by means of infrared or ultrasonic signals. In the present embodiment, a display 42, a printer 43, a keypad 44 and a scanner 45 are present on the conveyor. All this equipment is controlled via apparatus 1, which is in wireless contact with the conveyor. Not all the above devices need to be present on the conveyor, the equipment may also be limited to keypad 44, by means of which the warehouse employee can operate apparatus 1.

Figure 5:
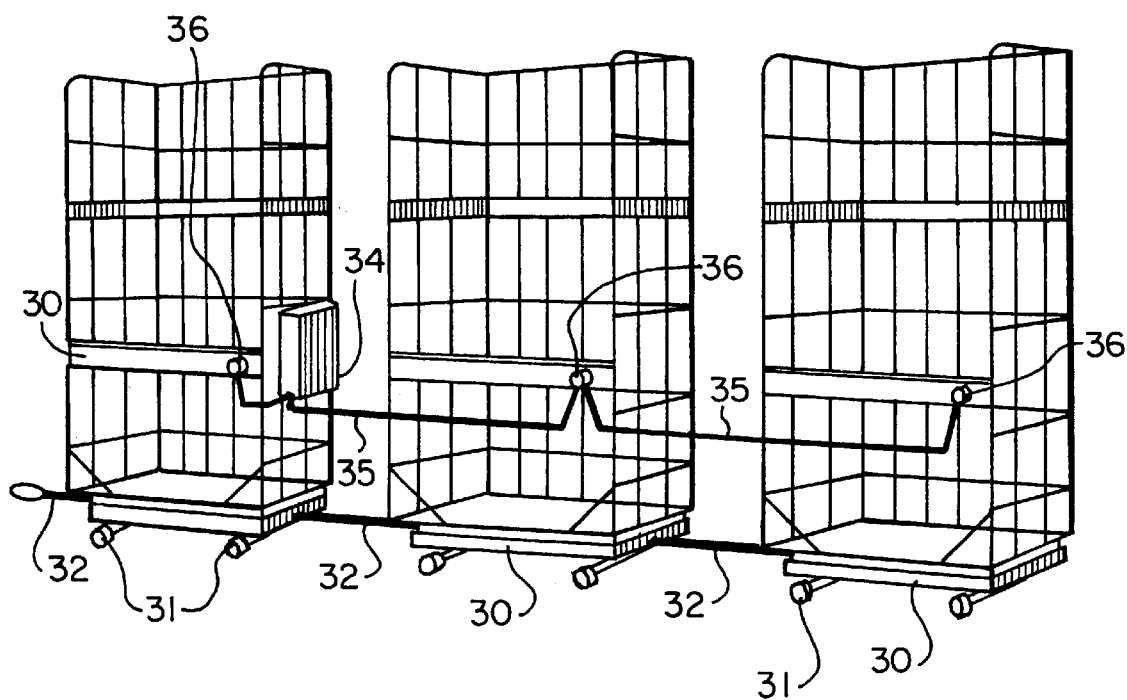
FIG. 5 shows another example of a conveyor.

FIG. 5 shows a row of interconnected trolleys, which can be driven through the warehouse for the purpose of collecting objects (or for distributing objects). The present embodiment comprises three trolleys 30, which are provided with wheels 31 and which are each provided with a drawbar 32, by means of which trolley 30 can be drawn. Objects having a common destination are to be collected in the respective trolleys 30. A light 36 is present on each of the trolleys 30, which lights can be caused to light up by signals which they receive from receiver 34 via conductor wires 35. Receiver 34 can be provided with information via the apparatus or from a central base station, which is in communication with the apparatus, and that by means of infrared or ultrasonic signals.

Although the above embodiment has only been described in connection with collecting objects in a warehouse, it is also possible in a similar manner to distribute objects in a warehouse for storage there.

The embodiment of the invention as explained above is to be considered a mere example, to which many variations are possible.

What is claimed is:

1. A method for collecting or storing objects in a warehouse, comprising the steps of:
    moving an apparatus along a rail to a location where objects are to be collected or stored, which apparatus provides information regarding the objects;
    providing said rail with electrical conductor means; and
    providing said apparatus with contact elements, which are in contact with said conductor means, via which said conductor means electric power is supplied to said apparatus for a drive unit which drives the apparatus, wherein said apparatus receives data for providing the information via said conductor means and via said contact elements, wherein said data are received by the apparatus and transmitted by said apparatus (i) during short interruptions of the supply of electric power to the apparatus, or (ii) while electric power is being supplied to the drive unit.

2. The method according to claim 1, wherein:
    said apparatus transmits data to a processing and/or storage unit for said data via said contact elements and said conductor means:
    a conveyor is driven to the location where the apparatus is present; and
    a wireless exchange of data takes place between the apparatus and the conveyor by means of infrared or ultrasonic signals.

3. The method according to claim 1, wherein:
    a conveyor is driven to the location where the apparatus is present; and
    a wireless exchange of data takes place between the apparatus and the conveyor by means of infrared or ultrasonic signals.

4. The method according to claim 1, wherein a warehouse employee communicates with the apparatus by means of a keypad and/or a display which is disposed remote from the apparatus, wherein said data are transmitted by means of infrared or ultrasonic signals.

5. The method according to claim 1, wherein a signal is supplied to the apparatus which indicates that the transmission of data is about to be started, which signal may be comprised of the brief turning off or reduction of the current supplied to the apparatus.

6. A device for collecting or storing objects in a warehouse, which device comprises:
    an apparatus which is capable of indicating how many objects are to be collected or stored at a particular location and/or which converts data into visible or audible information;
    a rail along which said apparatus can be moved, which rail is provided with electrical conductor means;
    contact elements, which are in contact with said conductor means, via which conductor means and contact elements electric power can be supplied to the apparatus for a drive unit which drives the apparatus; and
    means for supplying said apparatus with data via said conductor means and said contact elements for providing said information, wherein said data are transmitted by said means for supplying and are received by said apparatus (i) during short interruptions of the supply of electric power to the apparatus, or (ii) while electric power is being supplied to the drive unit.

7. The device according to claim 6, wherein said contact elements are sliding contacts which are capable of sliding along the conductor means which are provided in said rail.

8. The device according to claim 7, wherein said apparatus includes at least one of the following:
    a keypad;
    a display;
    a printer;
    a loudspeaker;
    an indicator;
    a pilot light;
    a carrying handle; and
    a scanner which is capable of reading a bar code on the rail.

9. The device according to claim 7, wherein a conveyor is provided which can be moved to a location by operating staff, which conveyor is provided with means which are capable of communicating with said apparatus by means of infrared or ultrasonic signals.

10. The device according to claim 6, wherein said contact elements comprise wheels which are capable of rolling on the conductor means provided in said rail.

11. The device according to claim 10, wherein said apparatus includes at least one of the following:
    a keypad;
    a display;
    a printer;
    a loudspeaker;
    an indicator;
    a pilot light;
    a carrying handle; and
    a scanner which is capable of reading a bar code on the rail.

12. The device according to claim 10, wherein a conveyor is provided which can be moved to a location by operating staff, which conveyor is provided with means which are capable of communicating with said apparatus by means of infrared or ultrasonic signals.

13. The device according to claim 6, wherein said apparatus includes at least one of the following:
    a keypad;
    a display;
    a printer;
    a loudspeaker;
    an indicator;
    a pilot light;
    a carrying handle; and
    a scanner which is capable of reading a bar code on the rail.

14. The device according to claim 13, wherein a conveyor is provided which can be moved to a location by operating staff, which conveyor is provided with means which are capable of communicating with said apparatus by means of infrared or ultrasonic signals.

15. The device according to claim 6, wherein a conveyor is provided which can be moved to a location by operating staff, which conveyor is provided with means which are capable of communicating with said apparatus by means of infrared or ultrasonic signals.

* * * * *